(12) United States Patent
Small

(10) Patent No.: US 7,652,625 B2
(45) Date of Patent: Jan. 26, 2010

(54) SYSTEM AND METHOD FOR THE MITIGATION OF MULTIPATH AND THE IMPROVEMENT OF SIGNAL-TO-NOISE RATIOS IN TIME DIVISION MULTIPLE ACCESS(TDMA) LOCATION NETWORKS

(76) Inventor: David Small, Locata Corporation, 401 Clunies Ross St., Acton, A.C.T (AU) 2601

(*) Notice: Subject to any disclaimer, the term of this patent is extended or adjusted under 35 U.S.C. 154(b) by 34 days.

(21) Appl. No.: 10/527,747

(22) PCT Filed: Sep. 19, 2003

(86) PCT No.: PCT/AU03/01246

§ 371 (c)(1),
(2), (4) Date: Mar. 14, 2005

(87) PCT Pub. No.: WO2004/027927

PCT Pub. Date: Apr. 1, 2004

(65) Prior Publication Data

US 2006/0012521 A1  Jan. 19, 2006

(30) Foreign Application Priority Data

Sep. 20, 2002 (AU) .............................. 2002951632

(51) Int. Cl.
*G01S 1/08* (2006.01)
*G01S 3/02* (2006.01)
*G01S 5/02* (2006.01)
(52) U.S. Cl. ........................ 342/386; 342/428; 342/464
(58) Field of Classification Search ................. 342/386, 342/428, 450, 457, 463, 464; 455/456.2, 455/456.6, 457
See application file for complete search history.

(56) References Cited

U.S. PATENT DOCUMENTS 5,648,784 A * 7/1997 Benedicto Ruiz et al. ... 342/373
2003/0086386 A1 * 5/2003 Tillotson .................... 370/321

* cited by examiner

*Primary Examiner*—Dao L Phan

(57) ABSTRACT

A positioning system that includes a plurality of chronologically synchronized Time Division Multiple Access (TDMA) Positioning-Unit Devices and a position receiver incorporating a TDMA Adaptive Directional Antenna Array is disclosed. The plurality of chronologically synchronized Positioning-Unit Devices, positioned at known locations, transmit positioning signals in a predetermined Time Division Multiple Access (TDMA) sequence, such that each Positioning-Unit Device has a unique transmission time slot. The TDMA Adaptive Directional Antenna Array is configured to consecutively steer a directional receive antenna in spatial synchronization with the plurality of Time Division Multiple Access (TDMA) Positioning-Unit Device transmissions, such that the directional receive antenna is oriented toward the currently transmitting Positioning-Unit Device, or the directional receive antenna is oriented toward the origin of the currently received positioning signal. The TDMA Adaptive Directional Antenna Array is controlled by a deterministic algorithm based on the knowledge of the Positioning-Unit Device locations, TDMA Adaptive Directional Antenna Array location, TDMA Adaptive Directional Antenna Array attitude, network Time Division Multiple Access (TDMA) transmission sequencing, Positioning-Unit Device positioning signal propagation delays, and network time.

20 Claims, 5 Drawing Sheets

SYSTEM AND METHOD FOR THE MITIGATION OF MULTIPATH AND THE IMPROVEMENT OF SIGNAL-TO-NOISE RATIOS IN TIME DIVISION MULTIPLE ACCESS(TDMA) LOCATION NETWORKS

CROSS-REFERENCE TO RELATED APPLICATIONS

This application is a national stage filing under 35 U.S.C. § 371 based upon international application no. PCT/AU03/01246, filed 19 Sep. 2003 and published in English on 1 Apr. 2004 under international publication no. WO 2004/027927, which claims priority to Australian patent application no. AU2002951632, filed 20 Sep. 2002.

FIELD OF THE INVENTION

The present invention relates generally to systems and methods for generating precise position determinations for a mobile apparatus in the presence of noise and multipath interference. In particular, the present invention relates to the mitigation of code and carrier-phase multipath and the improvement of signal-to-noise ratios in received positioning signals generated by Time Division Multiple Access (TDMA) location networks.

BACKGROUND OF THE INVENTION

One of the largest error sources in all radio frequency (RF) positioning systems is multipath. Multipath refers to the phenomenon of a signal reaching a receive antenna via two or more paths. Typically, a receive antenna receives the direct signal and one or more signals reflected from structures in the receive antenna's vicinity. The subsequent range measurements determined by a position receiver are the sum of the received signals, which are generally measured "long" due to the delayed nature of the multipath reflections. Therefore, multipath reflections cause code-based pseudorange biases in location networks which can substantially degrade absolute position accuracy measured by a position receiver. Furthermore, multipath reflections which arrive at the receive antenna with phases different to those of the direct signal will sum destructively with the direct signal, and therefore cause a loss of received signal power, known as signal fading. Moderate signal fading causes measured carrier phase errors of up to +/−90 degrees, and pseudorange biases in the tens of metres. Severe signal fading causes receiver tracking loop destabilization, cycle slips, pseudorange biases in the hundreds of metres, and possible complete loss of lock on the positioning signal. Moreover, the unintentional measurement of off-axis multipath signals corrupts receiver Doppler measurements, leading to significant degradation in the accuracy of velocity and carrier range measurements in a position receiver. This makes velocity measurements read "low", and integrated carrier phase measurements range "short".

Received signal-to-noise ratios of positioning signals also affect the measured precision of ranging signals. In general, the greater the received signal strength the better accuracy of the measurement. Signal-to-noise ratios are degraded by (1) increasing distance from the transmission source, (2) signal attenuation caused by line-of-sight obstructions, such as buildings and foliage, (3) multipath signal fading, and (4) an increased noise floor caused by intentional or unintentional signal jammers emitting signals on the positioning signal frequency.

Prior art methodologies for noise and multipath mitigation using antenna design have focused on two key areas; (1) multipath limiting antennas, and (2) Programmable Multi-beam Antenna Arrays. Multipath limiting antennas shape the receive antenna gain pattern to reduce the strength of reflected off-axis signals. The most common form of this antenna being the so-called choke ring antenna used in GPS applications for mitigating satellite signal ground reflections. Multipath limiting antennas traditionally position a directional gain antenna in a fixed orientation, generally positioned facing away from the offending reflective surface (the ground in the case of the choke ring OPS antenna). This method has limited application in high multipath environments, such as indoors or urban areas, where signals reflect from many directions including buildings, walls, floors, ceilings, furniture, and people.

Programmable Multi-beam Antenna Arrays dynamically shape the receive antenna gain pattern to reduce the effect of interference sources, such as intentional signal jammers, and also reduce the affect of multipath signals. Programmable Multi-beam Antenna Arrays either; (1) combine a plurality of antenna elements to form a gain null in a single antenna gain pattern, or (2) combine a plurality of directional gain antennas, each focused on one of the GPS satellites, to form a plurality of peaks in a single antenna gain pattern, or (3) individually monitor a plurality of directional gain antennas, each focused on one of the GPS satellites, through a matrix of receiver circuitry. A Programmable Multi-Beam Antenna Array, which produces a dynamically adjustable gain null in its antenna gain pattern, has application for mitigating the effect of signal jamming and thus improving received signal-to-noise ratios by decreasing antenna gain in the direction of the noise source. However, this antenna array has limited application for multipath mitigation in high multipath environments, where multipath signals reflect from many directions. A Programmable Multi-Beam Antenna Array, which produces a plurality of dynamically adjustable gain peaks in its antenna gain pattern, has application for mitigating the effect of signal jamming and improving received signal-to-noise ratios by increasing gain in the direction of the satellites and decreasing gain in the direction of the noise source. However, this antenna array has limited application for multipath mitigation in high multipath environments, where a significant amount of multipath is received through off-axis antenna gain peaks, which are intended for the reception of other satellite positioning signals. Individually monitoring a plurality of directional gain antennas through a matrix of receiver circuitry has application for mitigating the effect of signal jamming and improving received signal-to-noise ratios, and also mitigating the affect of multipath. However, a matrix of receiver circuitry has many disadvantages, including: (a) the potential for time-variant group delay and line biases being introduced into individual positioning signal measurements due to the use of disparate receive paths. These delays change with variations of component temperature and supply voltage, thus causing time variant ranging errors and subsequent position inaccuracies in the position receiver Position Velocity Time (PVT) solutions; (b) heavy power consumption due to the additional radio frequency (RF) circuitry, making the position receiver unsuitable for applications where battery weight and size are restricted; (c) the requirement for proportionally more electronic components than a standard single front-end receiver design, making the position receiver relatively expensive to produce; and (d) the large form factor required to house the additional receive circuitry, making the receiver larger than a standard single front-end receiver. A system that can provide positioning signals free from the encumbrance of severe multipath and degraded signal-to-noise ratios, without any of these constraints, is highly desirable. The present invention achieves this desirable goal by spatially synchronizing a Time Division Multiple Access (TDMA) Adaptive Directional Antenna Array to a chronologically synchronous Time Division Multiple Access (TDMA) location network, as described below.

OBJECT OF THE INVENTION

It is an object of the present invention to provide a positioning system and method for making precise code and carrier phase range measurements free from the encumbrance of severe multipath, such that accurate code and carrier phase Position, Velocity, and Time (PVT) solutions may be determined.

It is yet a further object of the present invention to provide a positioning system and method for improving measured positioning signal signal-to-noise ratios (SNR), such that accurate code and carrier phase Position, Velocity, and Time (PVT) solutions may be determined.

It is yet a further object of the present invention to provide a positioning system and method for improving measured positioning signal signal-to-noise ratios (SNR) over relatively large distances, or through radio frequency (RF) obstructed environments, or through radio frequency (RF) jammed environments, such that accurate code and carrier phase Position, Velocity, and Time (PVT) solutions may be determined.

It is yet a further object of the present invention to provide a positioning system and method for making precise code and carrier phase range measurements in the presence of noise and multipath utilizing a position receiver that incorporates a single front-end receiver design.

SUMMARY OF THE INVENTION

The foregoing objects of the present invention are achieved by consecutively steering a directional receive antenna in spatial synchronization with a plurality of Time Division Multiple Access (TDMA) Positioning-Unit Device transmissions, such that the directional receive antenna is oriented toward the currently transmitting Positioning-Unit Device, or is oriented toward the origin of the currently received positioning signal. The directional receive antenna is controlled by a deterministic algorithm based on the knowledge of the Positioning-Unit Device locations, directional receive antenna location, directional receive antenna attitude, network Time Division Multiple Access (TDMA) transmission sequencing, Positioning-Unit Device positioning signal propagation delays, and network time.

OVERVIEW

Figure 1:
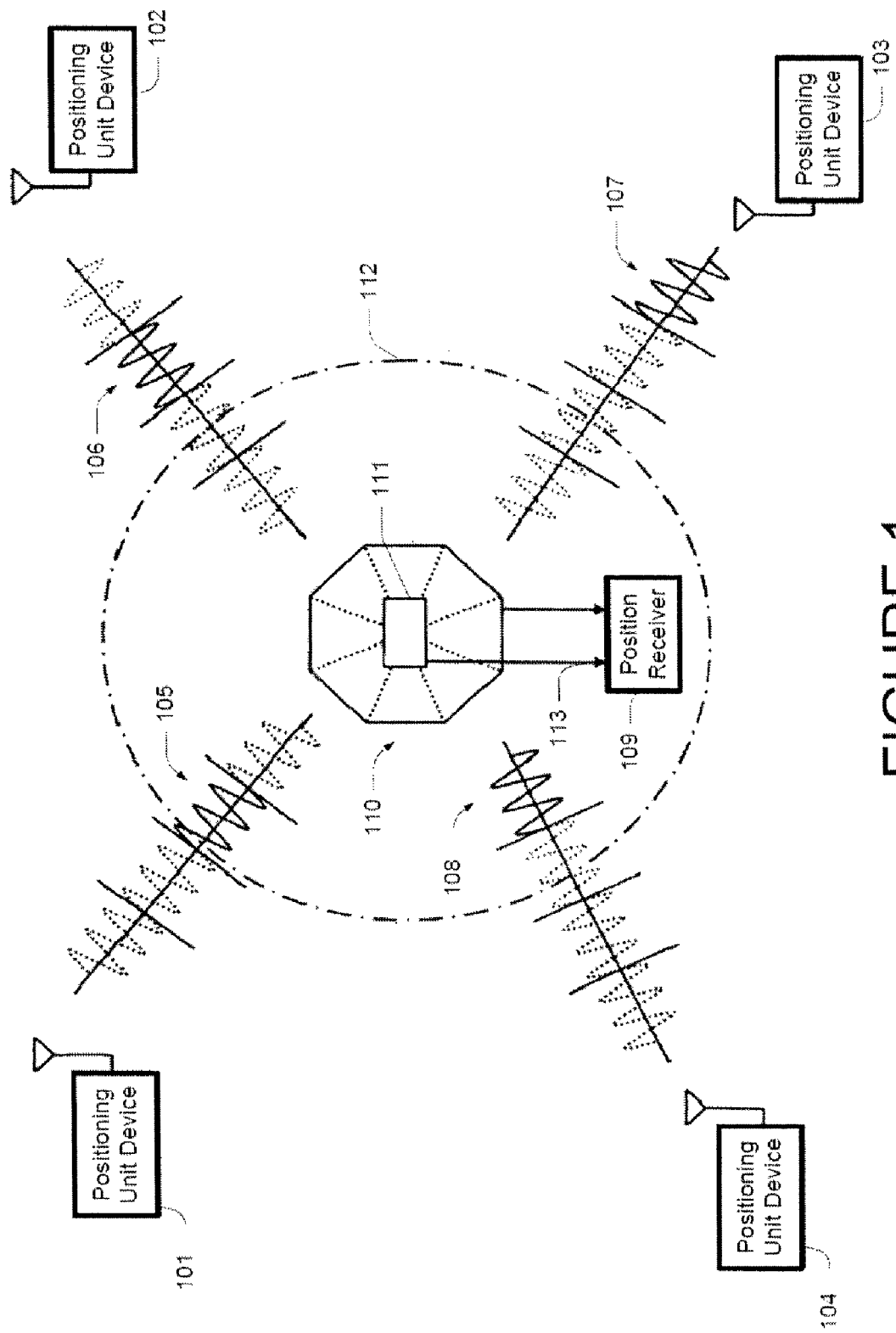
FIG. 1 is a graphical representation of the Time Division Multiple Access (TDMA) positioning system according to the present invention, wherein a network of chronologically synchronized Positioning-Unit Devices transmit chronologically synchronous Time Division Multiple Access (TDMA) positioning signals to a roving position receiver, via a spatially unsynchronized TDMA Adaptive Directional Antenna Array. The spatially unsynchronized TDMA Adaptive Directional Antenna Array is configured in an omni-directional gain pattern for positioning signal acquisition.

A plurality of chronologically synchronized Positioning-Unit Devices, positioned at known locations, transmit positioning signals in a predetermined Time Division Multiple Access (TDMA) sequence, such that each transmitter has a unique transmission time slot. A position receiver is configured to receive Time Division Multiple Access (TDMA) positioning signals from the network of Positioning-Unit Devices via a directionally agile beam antenna The directionally agile beam antenna, known as a TDMA Adaptive Directional Antenna Array, is capable of producing a directional gain pattern which can be successively steered in a plurality of directions. The TDMA Adaptive Directional Antenna Array is configured with an attitude determination means, such as an Inertial Navigation System (INS), to provide orientation of the TDMA Adaptive Directional Antenna Array.

The position receiver is configured to spatially synchronize the TDMA Adaptive Directional Antenna Array to the Time Division Multiple Access (TDMA) transmission sequence of the network of Positioning-Unit Devices using; (1) the Positioning-Unit Device locations determined from the Positioning-Unit Device navigation messages; (2) the Time Division Multiple Access (TDMA) transmission sequences determined from the Positioning-Unit Device navigation messages; (3) the TDMA Adaptive Directional Antenna Array attitude provided by the attitude determination means; (4) the TDMA Adaptive Directional Antenna Array location determined by the position receiver Position Velocity Time (PVT)

solution; (5) network time determined by the position receiver Position Velocity Time (PVT) solution; and (6) positioning signal Time Division Multiple Access (TDMA) transmission propagation delays determined from the acquired Positioning-Unit Device locations and the determined TDMA Adaptive Directional Antenna Array location. The TDMA Adaptive Directional Antenna Array directional gain pattern is sequentially switched to follow the Time Division Multiple Access (TDMA) sequence of the Positioning-Unit Device transmissions, such that the directional gain pattern is oriented toward the currently transmitting Positioning-Unit Device, or is oriented toward the origin of the currently received positioning signal. As the TDMA Adaptive Directional Antenna Array location and attitude change due to user movement the position receiver adjusts the TDMA Adaptive Directional Antenna Array directional gain pattern azimuth and elevation to follow the currently transmitting Positioning-Unit Device, or to follow the origin of the currently received positioning signal.

Thus, as detailed below, a TDMA Adaptive Directional Antenna Array is a specialized receive antenna that is spatially synchronized to a chronologically synchronous Time Division Multiple Access (TDMA) network of Positioning-Unit Devices. The TDMA Adaptive Directional Antenna Array provides both multipath mitigation and improved signal to noise ratios for positioning signals received by a position receiver by successively steering a directional receive antenna toward the currently transmitting Positioning-Unit Device, or successively steering a directional receive antenna toward the origin of the currently received positioning signal.

System and Method

Referring to FIG 1., there is depicted a network of chronologically synchronized Positioning-Unit Devices 101, 102, 103, & 104, transmitting chronologically synchronous Time Division Multiple Access (TDMA) positioning signals 105, 106, 107, 108. There is also depicted a position receiver 109, a TDMA Adaptive Directional Antenna Array 110, and an attitude determination means 111. The network of chronologically synchronized Positioning-Unit Devices 101, 102, 103, & 104 transmit Time Division Multiple Access (TDMA) positioning signals 105, 106, 107, & 108, such that each Positioning-Unit Device transmission has its own unique time slot. The position receiver 109 is configured to receive Time Division Multiple Access (TDMA) positioning signals 105, 106, 107, 108, from the network of Positioning-Unit Devices 101, 102, 103, & 104, through the TDMA Adaptive Directional Antenna Array 110. The TDMA Adaptive Directional Antenna Array 110 incorporates an attitude determination means 111, such that the orientation of the TDMA Adaptive Directional Antenna Array 110 can be determined. The position receiver 109 initially configures the TDMA Adaptive Directional Antenna Array 110 in an omni-directional gain pattern 112 to allow acquisition of all Positioning-Unit Devices in-view 101, 102, 103, & 104. The position receiver 109 interrogates navigation data transmitted from each acquired Positioning-Unit Device to determine Positioning-Unit Device location 101, 102, 103, & 104, and Positioning-Unit Device Time Division Multiple Access (TDMA) pulsed transmission sequence 105, 106, 107, & 108. The position receiver 109 subsequently performs a Position, Velocity and Time (PVT) solution to determine coarse receiver position, coarse receiver velocity, and coarse network time. Position, Velocity, and Time (PVT) solutions, also known as "single point position" solutions, are well known in the art and are not a subject of the present invention. With Positioning-Unit Device locations determined from received navigation messages, and coarse receiver location determined by the Position, Velocity, and Time (PVT) solution the position receiver 109 calculates the coarse elevation and azimuth information for all Positioning-Unit Devices in-view 101, 102, 103, & 104. The position receiver 109 also determines the TDMA Adaptive Directional Antenna Array 110 orientation by processing attitude data 113 provided by the attitude determination means 111.

Figure 2:
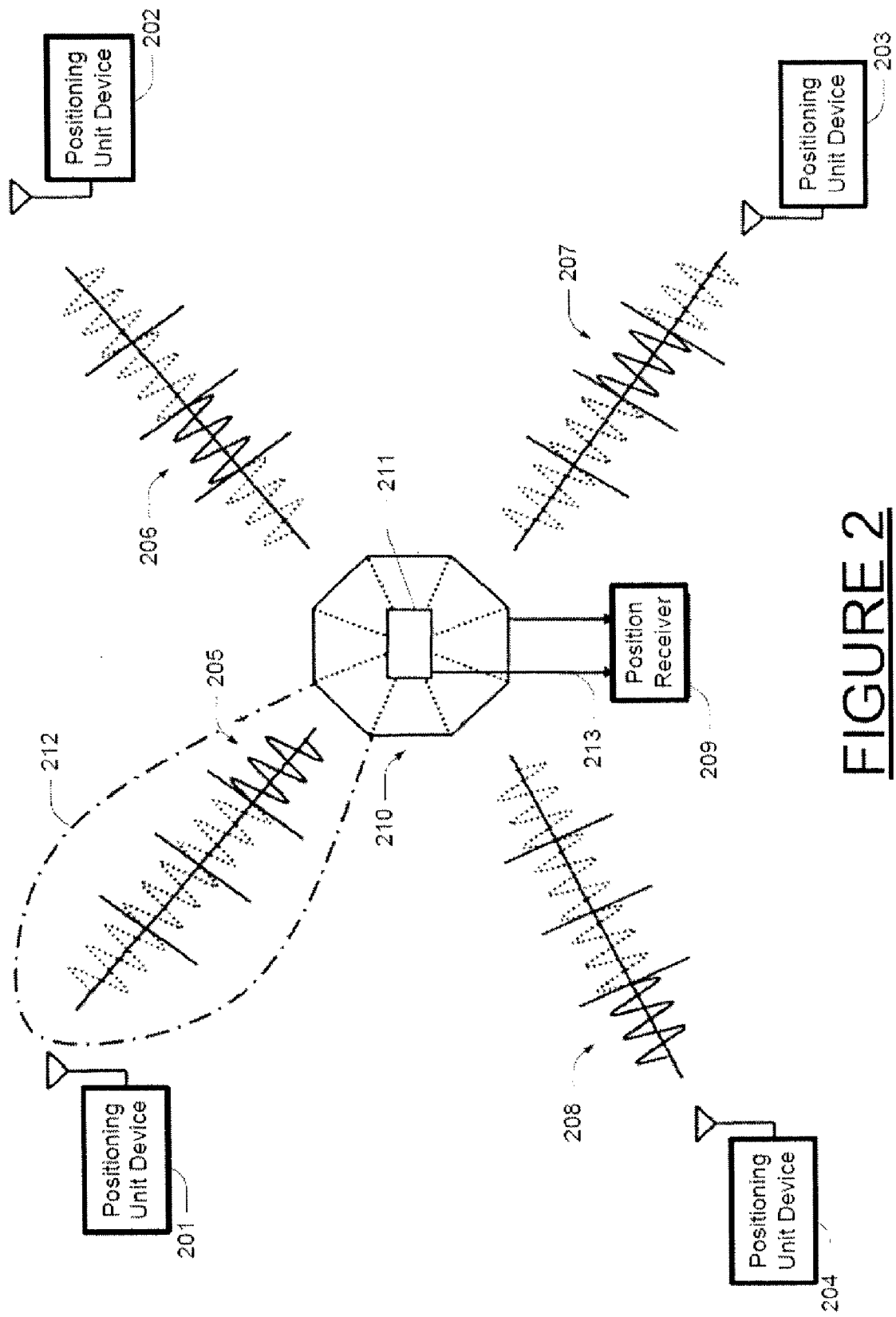
FIG. 2 is a graphical representation of the Time Division Multiple Access (TDMA) positioning system according to the present invention, depicting a subsequent time epoch from the time epoch depicted in FIG. 1. A position receiver receives a Time Division Multiple Access (TDMA) positioning signal transmission from a currently transmitting Positioning-Unit Device, via a spatially synchronized TDMA Adaptive Directional Antenna Array. The spatially synchronized TDMA Adaptive Directional Antenna Array is configured to steer a directional gain pattern toward the currently transmitting Positioning-Unit Device for individual positioning signal tracking.

Following on from FIG. 1., and referring now to FIG. 2., there is depicted a network of chronologically synchronized Positioning-Unit Devices 201, 202, 203, & 204, transmitting chronologically synchronous Time Division Multiple Access (TDMA) positioning signals 205, 206, 207, 208, in a subsequent Time Division Multiple Access (TDMA) time slot. There is also depicted a position receiver 209, a TDMA Adaptive Directional Antenna Array 210, and an attitude determination means 211. The position receiver 209 interrogates navigation data transmitted from each acquired Positioning-Unit Device 201, 202, 203, & 204 to determine Positioning-Unit Device location 201, 202, 203, & 204, and Positioning-Unit Device TDMA pulsed transmission sequence 205, 206, 207, & 208. The position receiver 209 subsequently performs a Position, Velocity and Time (PVT) solution to determine receiver position, receiver velocity, network time, and elevation and azimuth information for all Positioning-Unit Devices in-view 201, 202, 203, & 204. The position receiver 209 determines the Positioning-Unit Device 201 that will commence transmission in the next Time Division Multiple Access (TDMA) time slot by comparing current network time provided by the Position Velocity Time (PVT) solution, with Positioning-Unit Device Time Division Multiple Access (TDMA) transmission sequences provided by the Positioning-Unit Device navigation messages. The position receiver 209 determines the direction-of-arrival of the next Positioning-Unit Device 201 positioning signal 205 by comparing the calculated azimuth and elevation information derived from the Position, Velocity, and Time (PVT) solution with the current TDMA Adaptive Directional Antenna Array 210 attitude provided by the attitude determination means 211. The position receiver 209 configures the TDMA Adaptive Directional Antenna Array 210 to produce a directional gain pattern 212, which is steered in the direction of the next transmitting Positioning-Unit Device 201 at the commencement of its transmission 205. The position receiver 209 continues to direct the TDMA Adaptive Directional Antenna Array 210 directional gain pattern 212 toward the origin of the currently received Positioning-Unit Device 201 positioning signal 205 until the cessation of its Time Division Multiple Access (TDMA) pulsed transmission 205.

Figure 3:
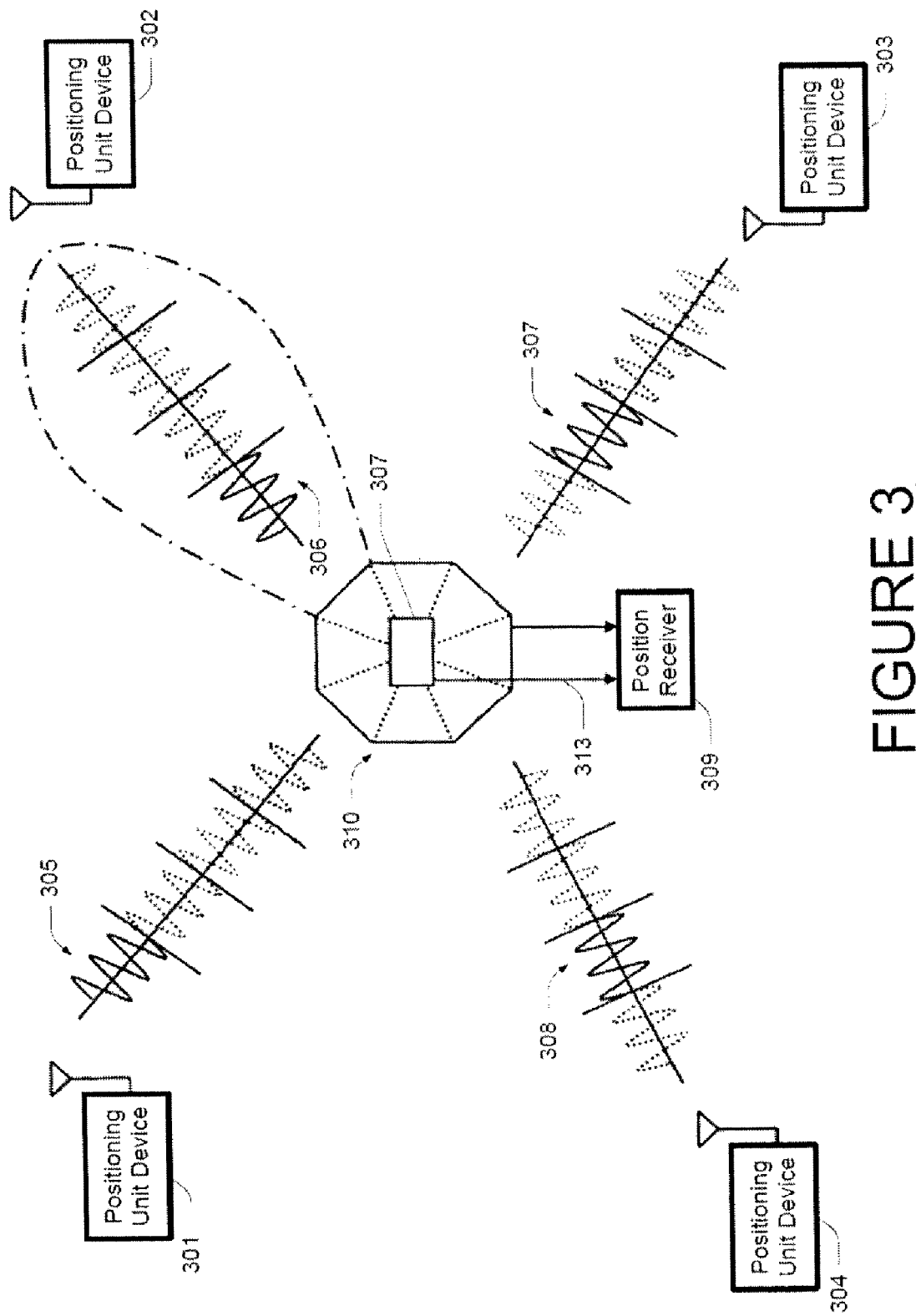
FIG. 3 is a graphical representation of the Time Division Multiple Access (TDMA) positioning system according to the present invention, depicting a subsequent time epoch from the time epoch depicted in FIG. 2. A position receiver receives a Time Division Multiple Access (TDMA) positioning signal transmission from a currently transmitting Positioning-Unit Device, via a spatially synchronized TDMA Adaptive Directional Antenna Array. The spatially synchronized TDMA Adaptive Directional Antenna Array is configured to steer a directional gain pattern toward the currently transmitting Positioning-Unit Device for individual positioning signal tracking.

Following on from FIG. 2., and referring now to FIG. 3., there is depicted a network of chronologically synchronized Positioning-Unit Devices 301, 302, 303, & 304, transmitting chronologically synchronous Time Division Multiple Access (TDMA) positioning signals 305, 306, 307, 308, in a subsequent Time Division Multiple Access (TDMA) time slot. There is also depicted a position receiver 309, a TDMA Adaptive Directional Antenna Array 310, and an attitude determination means 311. The position receiver 309 interrogates navigation data transmitted from each acquired Positioning-Unit Device 301, 302, 303, & 304 to determine Positioning-Unit Device location 301, 302, 303, & 304, and Positioning-Unit Device Time Division Multiple Access (TDMA) pulsed transmission sequence 305, 306, 307, & 308. The position receiver 309 subsequently performs a Position, Velocity and Time (PVT) solution to determine receiver position, receiver velocity, network time, and elevation and azimuth information for all Positioning-Unit Devices in-view 301, 302, 303, & 304. The position receiver 309 determines the Positioning-Unit Device 302 that will be received in the next TDMA time slot by comparing current network time provided by the Position Velocity Time (PVT) solution, with Positioning-Unit Device Time Division Multiple Access (TDMA) transmission sequences and Positioning-Unit Device location provided by the Positioning-Unit Device navigation messages. The position receiver 309 determines the direction-of-arrival of the next Positioning-Unit Device 302 positioning signal 306 by comparing the calculated azimuth and elevation information derived from the Position, Velocity, and Time (PVT) solution with the current TDMA Adaptive Directional Antenna Array 310 attitude provided by the attitude determination means 311. The position receiver 309 configures the TDMA Adaptive Directional Antenna Array 310 to produce a directional gain pattern 312, which is steered in the direction of the next transmitting Positioning-Unit Device 302 at the commencement of its transmission 306. The position receiver 309 continues to direct the TDMA Adaptive Directional Antenna Array 310 directional gain pattern 312 toward the origin of the currently received Positioning-Unit Device 302 positioning signal 306 until the cessation of its Time Division Multiple Access (TDMA) pulsed transmission 306. The above described process is continuously repeated for all available Time Division Multiple Access (TDMA) time slots.

Accurate position, velocity and time can now be determined by the position receiver by performing a Position, Velocity and Time (PVT) solution while the TDMA Adaptive Directional Antenna Array is spatially synchronized. Off-axis multipath is mitigated through the multipath limiting effect of the directional gain antenna, and received signal to noise ratios are increased through the increased forward gain of the directional gain antenna. Therefore, more accurate code and carrier phase position solutions can be determined in Time Division Multiple Access (TDMA) location networks which incorporate a TDMA Adaptive Directional Antenna Array than in Time Division Multiple Access (TDMA) location networks that do not.

TDMA Adaptive Directional Antenna Array Methods

A TDMA Adaptive Directional Antenna Array may be created using a variety of methods. In a first embodiment the TDMA Adaptive Directional Antenna Array incorporates a plurality of spatially distributed antenna elements, with each antenna element incorporating an adjustable phase and amplitude output. All antenna element outputs are combined to form a single output, which is fed to the position receiver radio frequency (RF) input. Each antenna element phase and amplitude is controlled via a control means, such as a microprocessor, so that various predetermined phase and amplitude values can be concurrently output from each antenna element. These outputs, when combined, create various antenna gain patterns that effectively allow the antenna array to be consecutively steered in a plurality of directions. This form of adaptive array is known as a "phased array" and is well known in the art.

In a second embodiment the TDMA Adaptive Directional Antenna Array incorporates a driven antenna element, which is connected to the position receiver radio frequency (RF) input, surrounded by a plurality of spatially distributed parasitic antenna elements. A parasitic antenna element is activated by shorting the antenna element to ground via a radio frequency (RF) switch, which subsequently changes the gain pattern of the parasitic array. Each parasitic antenna element RF switch is controlled via a control means, such as a microprocessor, so that various combinations of parasitic elements can be activated to create various antenna gain patterns, and therefore allow the antenna gain pattern to be consecutively steered in a plurality of directions. This form of adaptive array is known as a "Switched Parasitic Antenna Array" and is also well known in the art.

In a third embodiment the TDMA Adaptive Directional Antenna Array incorporates a plurality of directional gain antennas, each facing in a unique direction. Each directional gain antenna output is connected to a radio frequency (RF) switch. The outputs of all radio frequency (RF) switches are combined and fed into the position receiver radio frequency (RF) input. Each radio frequency (RF) switch is controlled via a control means, such as a microprocessor, so that each antenna element, or a combination of antenna elements, can be activated at various times to create various antenna gain patterns. This allows the TDMA Adaptive Directional Antenna Array pattern to be consecutively steered in a plurality of directions. In the preferred embodiment the antenna that faces the origin of the currently received Positioning-Unit Device positioning signal is activated, with all other antennas deactivated.

Figure 4:
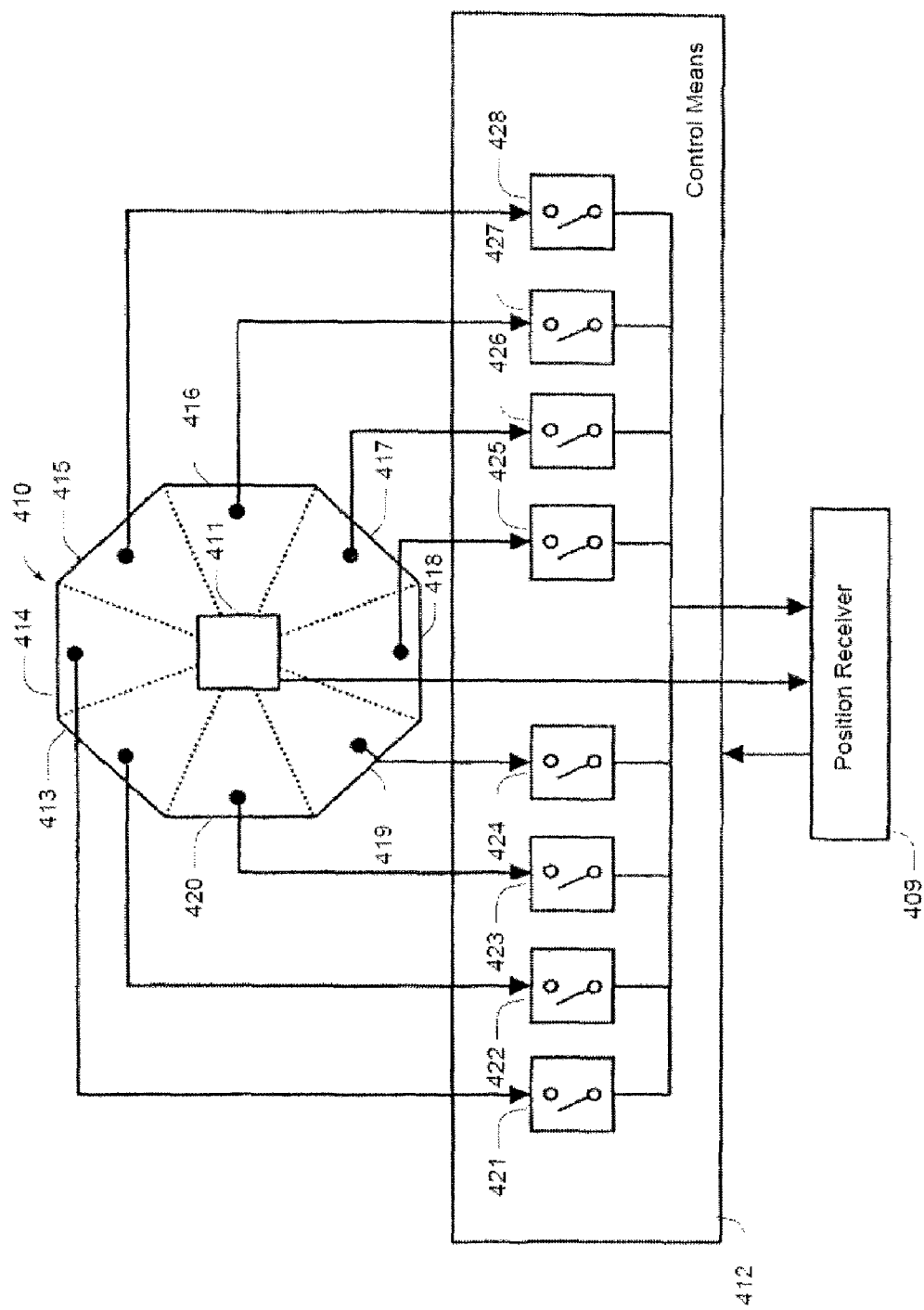
FIG. 4 is a graphical representation of a TDMA Adaptive Directional Antenna Array that incorporates a plurality of directional gain antennas. Each directional gain antenna is connected to a position receiver via a control means that incorporates a plurality of radio frequency (RF) switches.

Referring now to FIG. 4., there is depicted a TDMA Adaptive Directional Antenna Array incorporating a plurality of directional gain antennas 410, an attitude determination means 411, a position receiver 409, and a control means 412. The TDMA Adaptive Directional Antenna Array 410 incorporates eight directional gain antennas 413, 414, 415, 416, 417, 418, 419, & 420. Each directional gain antenna 413, 414, 415, 416, 417, 418, 419, & 420 has a field-of-view (FOV) of forty five degrees, giving a complete field-of-view (FOV) of 360 degrees. Table 1 shows the angular range of the field-of-view (FOV) of each directional gain antenna, where zero degrees is the centre of the field-of-view (FOV) of a reference directional gain antenna 413, with angular values increasing in a clockwise direction.

TABLE 1

| Directional Gain Antenna | FOV Range |
|---|---|
| 413 | $x \geq 337.5°$ or $x \leq 22.5°$ |
| 414 | $22.5° \leq x \leq 67.5°$ |
| 415 | $67.5° \leq x \leq 112.5°$ |
| 416 | $112.5° \leq x \leq 157.5°$ |
| 417 | $157.5° \leq x \leq 202.5°$ |
| 418 | $202.5° \leq x \leq 247.5°$ |
| 419 | $247.5° \leq x \leq 292.5°$ |
| 420 | $292.5° \leq x \leq 337.5°$ |

The output of each directional gain antenna 413, 414, 415, 416, 417, 418, 419, & 420 is connected to individual radio frequency (RF) switches 421, 422, 423, 424, 425, 426, 427, & 428, which pass the received positioning signals to the position receiver 409 when activated, or discard the received positioning signal to ground when deactivated. Each radio frequency (RF) switch 421, 422, 423, 424, 425, 426, 427, & 428, is also connected to a position receiver control means 412, such that the position receiver 409 can activate each directional gain antenna as required and successively steer the TDMA Adaptive Directional Antenna Array gain pattern in a desired direction. An attitude determination means 411 associated with the TDMA Adaptive Directional Antenna Array 410 is aligned with the reference directional gain antenna 413. The attitude determination means 411 provides the orientation of the reference directional gain antenna 413 relative to a common directional indicator such as true north. This is referred to as the reference orientation bearing, and is continuously sent by the attitude determination means 411 to the position receiver 409.

Figure 5:
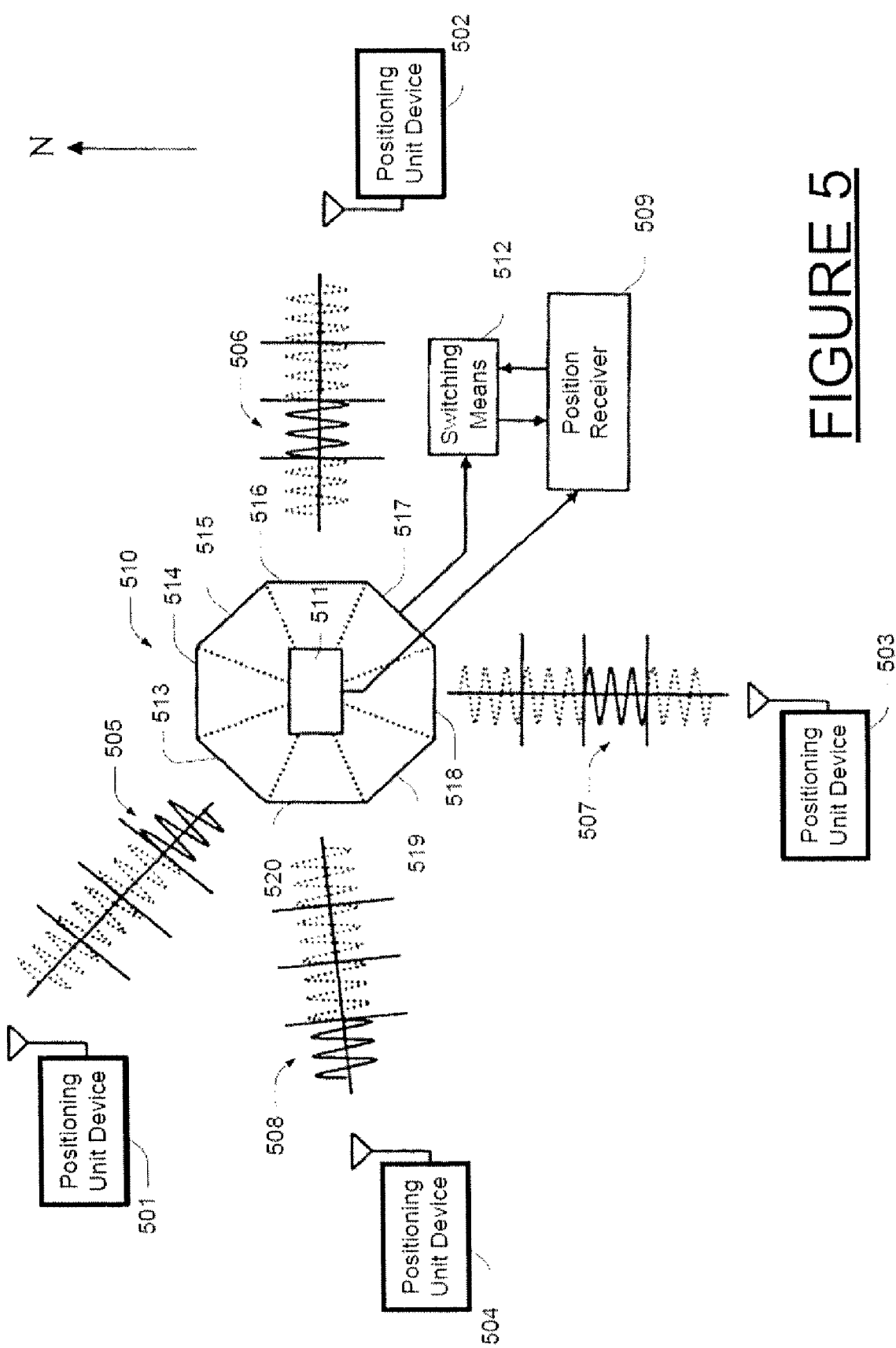
FIG. 5 is a graphical representation of the Time Division Multiple Access (TDMA) positioning system according to the present invention, whereby a position receiver receives Time Division Multiple Access (TDMA) positioning signal via a TDMA Adaptive Directional Antenna Array that incorporates a plurality of directional gain antennas.

Referring now to FIG. 5., there is depicted a network of chronologically synchronized Positioning-Unit Devices 501, 502, 503, & 504, transmitting chronologically synchronous Time Division Multiple Access (TDMA) positioning signals 505, 506, 507, 508. There is also depicted a position receiver 509, a TDMA Adaptive Directional Antenna Array incorporating a plurality of directional gain antennas 510, an attitude determination means 511, and a switching means 512. For illustrative example, the network of chronologically synchronized Positioning-Unit Devices 501, 502, 503, & 504 transmit positioning signals 505, 506, 507, 508, according to the network Time Division Multiple Access (TDMA) transmission scheme as given in Table 2, though the method of the present invention is equally applicable to other Time Division Multiple Access (TDMA) transmission schemes.

TABLE 2

| Time Slot | Transmitting Positioning-Unit Device |
|---|---|
| 1 (505) | 501 |
| 2 (506) | 502 |
| 3 (507) | 503 |
| 4 (508) | 504 |

The known location of each Positioning-Unit Device 501, 502, 503, & 504, and the network Time Division Multiple Access (TDMA) transmission scheme 505, 506, 507, 508, is preferably provided via each Positioning-Unit Devices navigation message, although this information may be provided a-priori to the position receiver 509 by some other means. In the preferred embodiment the known location of each Positioning Unit Device 501, 502, 503, & 504, is provided to the position receiver 509 in Earth Centered Earth Fixed (ECEF) co-ordinates, or some other convenient co-ordinate frame. For this illustrative example latitude and longitude co-ordinates are described.

Initially, before a Position Velocity Time (PVT) solution is computed by the position receiver 509, the location of the TDMA Adaptive Directional Antenna Array 510 and network time is unknown. Therefore, synchronization of the TDMA Adaptive Directional Antenna Array 510 with the network TDMA transmission scheme 505, 506, 507, 508, is not possible. Referring again to FIG. 4, the position receiver 409 subsequently activates all RF switches 421, 422, 423, 424, 425, 426, 427, & 428, and passes the output from all directional gain antennas 414, 415, 416, 417, 418, 419, & 420 during all time slots to the Position Receiver 409. Thus, positioning signals from the entire 360 degree field-of-view (FOV) are acquired. This is analogous to using a standard omni-directional receive antenna. Referring again to FIG. 5, from the coarse Position Velocity Time (PVT) solution calculated using the acquired positioning signals 505, 506, 507, & 508 approximate TDMA Adaptive Directional Antenna Array position and network time are determined. Given the location co-ordinates of each Positioning-Unit Device 501, 502, 503, & 504, and the approximate location co-ordinates of the TDMA Adaptive Directional Antenna Array 510, the position receiver 509 can calculate approximate azimuth and elevation angles to each Positioning-Unit Device from the TDMA Adaptive Directional Antenna Array 510 location. For this illustrative example the Positioning-Unit Device locations 501, 502, 503, & 504, as shown in Table 3, and the location of the TDMA Adaptive Directional Antenna Array 510 are provided in a two-dimensional co-ordinate frame, though the method of the present invention is equally applicable to three-dimensional co-ordinate frames.

TABLE 3

| Positioning Unit Device | Location |
|---|---|
| 501 | Latitude: 35.04° Longitude: 148.97° |
| 502 | Latitude: 35.00° Longitude: 149.10° |
| 503 | Latitude: 34.93° Longitude: 149.00° |
| 504 | Latitude: 34.99° Longitude: 148.94° |

The TDMA Adaptive Directional Antenna Array 510 approximate location is determined to be at co-ordinates 35.0° N, 149.0° E. The position receiver calculates azimuth to each Positioning-Unit Device 501, 502, 503, & 504 from the calculated position of the TDMA Adaptive Directional Antenna Array 510, as shown in Table 4 Column 2.

TABLE 4

| Positioning-Unit Device | Azimuth | Azimuth Offset | Azimuth Offset [0° ≦ x < 360°] |
|---|---|---|---|
| 501 | 328° | 13° | 13° |
| 502 | 90° | −225° | 135° |
| 503 | 180° | −135° | 225° |
| 504 | 258.5° | −56.5° | 303.5° |

The attitude determination means 511 determines the reference orientation bearing of the reference directional gain antenna 513 to be 315 degrees. The reference orientation bearing is subtracted from the calculated Positioning-Unit Device azimuth to form a so-called azimuth offset for each Positioning-Unit Device, as shown in Table 4, column 3. For example, the first Positioning-Unit Device 501 has an azimuth offset of 13 degrees. This means the first Positioning-Unit Device is located 13 degrees clockwise from the reference directional gain antenna 513 of the TDMA Adaptive Directional Antenna Array 510. Likewise, the third Positioning-Unit Device 503, with an azimuth offset of −135 degrees is located 135 degrees anticlockwise from the reference directional gain antenna 513 of the TDMA Adaptive Directional Antenna Array 510. Azimuth-offset values are also mapped into the range [0°≦x<360°], as shown in Table 4 Column 4, by the function:

$$F(x) = \begin{cases} x, & \text{if } x \geq 0; \\ 360 + x, & \text{if } x < 0; \end{cases}$$

The mapped azimuth offsets are then used to select the appropriate directional receive antenna for each time slot in the network Time Division Multiple Access (TDMA) transmission scheme by using the values given in Table 1 as a look-up table. The directional gain antenna, whose field-of-view (FOV) range includes the mapped azimuth offset for a given Positioning-Unit Device, is activated during the Positioning-Unit Devices Time Division Multiple Access (TDMA) time slot transmission. For illustrative example, the mapped azimuth offset for the third Positioning-Unit Device 503 is 225 degrees, which lies in the field-of-view (FOV) range of the sixth directional gain antenna 518 (202.5°≦x≦247.5°). Thus during the reception of the third Time Division Multiple Access (TDMA) time slot positioning signal 507, the control means 512 passes the output of the sixth directional gain antenna 518 to the Position Receiver 509. Performing this operation for each Positioning-Unit Device results in the Switching Table shown in Table 5, which indicates the directional gain antenna to be used for each Time Division Multiple Access (TDMA) time slot.

TABLE 5

| Time Slot | Active Directional Gain Antenna |
|---|---|
| Time Slot 1 (505) | 513 |
| Time Slot 2 (506) | 516 |
| Time Slot 3 (507) | 518 |
| Time Slot 4 (508) | 520 |

Iterating this process for every update in position and attitude will ensure correct alignment of the TDMA Adaptive Directional Antenna Array with the network Time Division Multiple Access (TDMA) transmission scheme.

Time Division Multiple Access (TDMA) Time Slot Overlap

As the distance between a Positioning-Unit Device and a position receiver increases the propagation delay of the transmitted positioning signal increases accordingly. This leads to the possibility that Time Division Multiple Access (TDMA) transmissions from a Positioning-Unit Device may not be received entirely in the Time Division Multiple Access (TDMA) time slot allocated by the position receiver. Consequently, the position receiver may direct the TDMA Adaptive Directional Antenna Array directional gain pattern away from the origin of the currently received Positioning-Unit Device positioning signal at the next allocated time slot, and miss the tail of the previous Positioning-Unit Devices Time Division Multiple Access (TDMA) transmission. The maximum propagation delay, before a Time Division Multiple Access (TDMA) transmission is received entirely in an adjacent time slot, is dependant on the transmission pulse width used in the network Time Division Multiple Access (TDMA) transmission scheme. In the preferred embodiment a 50 microsecond pulse is transmitted once every millisecond. This provides a propagation distance of 15 kilometres before the transmitted positioning signal will overlap entirely with an adjacent 50 microsecond time slot. When all Positioning-Unit Devices are in close proximity to the position receiver, say less than 1 kilometre, the received positioning signals will overlap by up to several microseconds. This overlap will cause a minor reduction in received signal-to-noise ratios due to the slight misalignment of the TDMA Adaptive Directional Antenna Array. When all Positioning-Unit devices are equidistant from the TDMA Adaptive Directional Antenna Array, the received Positioning-Unit Device positioning signals will not overlap neighbouring Time Division Multiple Access (TDMA) transmissions. However, if all Positioning-Unit Devices are equidistant at 15 kilometres from the position receiver, and the position receiver ignores the approximately 50 microsecond propagation delay from each Positioning-Unit Device, the TDMA Adaptive Directional Antenna Array will be switching one Time Division Multiple Access (TDMA) time slot advanced from the received positioning signals, and the subsequent Position Velocity Time (PVT) solution may fail. Furthermore, when Positioning-Unit devices distances vary significantly from the TDMA Adaptive Directional Antenna Array, received positioning signals may significantly overlap neighbouring Time Division Multiple Access (TDMA) transmissions. These overlaps can cause considerable disruption to the synchronization of the TDMA Adaptive Directional Antenna Array if not taken into consideration.

Therefore, the position receiver must take into consideration the signal propagation delay from each Positioning-Unit Device when calculating the appropriate time to steer the TDMA Adaptive Directional Antenna Array toward the origin of the currently received Positioning-Unit Device positioning signal. As the position receiver location changes, a deterministic algorithm considers the propagation delay from each Positioning-Unit Device and adjusts the TDMA Adaptive Directional Antenna Array synchronization to best fit the reception time of the Positioning-Unit Device Time Division Multiple Access (TDMA) transmissions. This requires the dynamic adjustment of Time Division Multiple Access (TDMA) time slot position and duration for the TDMA Adaptive Directional Antenna Array, depending on position receiver location.

Spatial Synchronization without Attitude

In a further embodiment of the present invention a TDMA Adaptive Directional Antenna Array may spatially synchronize to a Time Division Multiple Access (TDMA) location network without the requirement for an attitude determination means. Attitude determination means are not required when; (1) the TDMA Adaptive Directional Antenna Array is statically positioned with fixed attitude; or (2) the TDMA Adaptive Directional Antenna Array is mounted on a user platform which moves with fixed attitude. For illustrative example, a TDMA Adaptive Directional Antenna Array may be statically positioned with fixed attitude when configured with a stationary Positioning-Unit Device, which is configured to receive positioning signals from other Positioning-Unit Devices in its vicinity. For further illustrative example, a TDMA Adaptive Directional Antenna Array may be statically positioned with fixed attitude when configured with a deformation monitoring position receiver. Deformation monitoring position receivers measure the slight movements of structures, such as bridges and buildings, dependant on such variables as temperature and loading.

Furthermore, a TDMA Adaptive Directional Antenna Array does not require attitude determination means when mounted on a user platform which moves with fixed attitude. For illustrative example, a crane which moves in fixed x, y, and z planes, but exhibits no change in pitch, roll, or yaw, does not require a TDMA Adaptive Directional Antenna Array configured with an attitude determination means. Consequently, a position receiver is configured to spatially synchronize a fixed attitude TDMA Adaptive Directional Antenna Array to the Time Division Multiple Access (TDMA) transmission sequence of the network of Positioning-Unit Devices using; (1) the Positioning-Unit Device locations determined from the Positioning-Unit Device navigation messages; (2) the Time Division Multiple Access (TDMA) transmission sequences determined from the Positioning-Unit Device navigation messages; (3) the TDMA Adaptive Directional Antenna Array location determined by the position receiver Position Velocity Time (PVT) solution; (4) network time determined by the position receiver Position Velocity Time (PVT) solution; and (5) positioning signal Time Division Multiple Access (TDMA) transmission propagation delays determined from the acquired Positioning-Unit Device locations and the determined TDMA Adaptive Directional Antenna Array location. The TDMA Adaptive Directional Antenna Array directional gain pattern is sequentially switched to follow the Time Division Multiple Access (TDMA) sequence of the Positioning-Unit Device transmissions, such that the directional gain pattern is oriented toward the currently transmitting Positioning-Unit Device, or is oriented toward the origin of the currently received positioning signal. As the TDMA Adaptive Directional Antenna Array location changes due to user platform movement the position receiver adjusts the TDMA Adaptive Directional Antenna Array directional gain pattern azimuth and elevation to follow the currently transmitting Positioning-Unit Device, or to follow the origin of the currently received positioning signal.

Adaptive Beam-Width a further embodiment of the present invention the beam-width of the TDMA Adaptive Directional Antenna Array directional gain pattern may be dynamically adjusted depending on position receiver circumstance. As position and network time are determined more accurately by the position receiver, the azimuth and elevation to each Positioning-Unit Device will also become better known. Consequently the beam-width of the array may be narrowed to further mitigate multipath and further improve received signal-to-noise ratios. Beam-widths can be dynamically adjusted in a TDMA Adaptive Directional Antenna Array, in an embodiment which incorporates a phased array, by increasing the number of spatially distributed antenna elements in the array and configuring their phase and gain outputs to broaden or narrow the resultant beam pattern. Beam-widths can be dynamically adjusted in a TDMA Adaptive Directional Antenna Array, in an embodiment which incorporates switched parasitic antenna elements, by increasing the number of parasitic antenna elements in the array and switching predetermined combinations of these parasitic elements to broaden or narrow the resultant beam pattern. Beam-widths can be dynamically adjusted in a TDMA Adaptive Directional Antenna Array, in an embodiment which incorporates a plurality of directional gain antennas, by activating a plurality of adjacent directional gain antennas to broaden the directional gain pattern, or deactivating adjacent directional gain antennas to narrow the resultant beam pattern.

Attitude Determination Means

A position receiver may determine the attitude, either two-dimensionally or three-dimensionally, of the TDMA Adaptive Directional Antenna Array via an attitude determination means configured with the TDMA Adaptive Directional Antenna Array. The attitude determination means may include an Inertial Navigation System (INS), compass, star tracker, horizon sensor, or other attitude determination sensor. Any attitude determination means which provides the TDMA Adaptive Directional Antenna Array with attitude and orientation information may be used to fulfill the requirements of the present invention. An Inertial Navigation System (INS), as described in the present invention, may include devices such as an electronic compass, accelerometers and rate gyros. Inertial Navigation Systems (INS) and attitude determination systems are well known in the art, and are not a subject of the present invention.

Unique Positioning Signals

In the preferred embodiment each Positioning-Unit Device transmits a unique positioning signal, which consists of a carrier component, a pseudorandom code component, and a navigation data component. The carrier component is a sinusoidal radio frequency wave preferably transmitted in the 2.4 GHz ISM band, though the method of the present invention is equally applicable to other frequency bands. The pseudorandom number (PRN) code component is modulated upon the carrier component, and consists of a unique code sequence which can be distinguished amongst other pseudorandom code sequences transmitted by other devices on the same carrier frequency. This technique is known as Code Division Multiple Access (CDMA), and is well-known in the art. The navigation data component, also referred to as the "navigation message", is proprietary information modulated upon the pseudorandom code component, and provides a communications link to transfer navigation information to Positioning-Unit Devices and roving position receivers. Navigation information may include network time, Positioning-Unit Device locations, TDMA transmission sequences, and other desired network data. Each unique positioning signal is pseudo randomly pulsed in a predetermined Time Division Multiple Access (TDMA) transmission scheme, such that each Positioning-Unit Device transmits its unique positioning signal in a unique time slot.

Time Division Multiple Access (TDMA) Transmissions

In the preferred embodiment each Positioning-Unit Device pulses its transmission in a pseudorandom Time Division Multiple Access (TDMA) sequence. A 50 microsecond pulse is pseudo randomly transmitted once every millisecond, with the pseudorandom sequence repeating every 200 milliseconds. This provides a 5% duty cycle with 20 available Time Division Multiple Access (TDMA) time slots. The pseudorandom Time Division Multiple Access (TDMA) pulse transmission sequence of each Positioning-Unit Device is transmitted in its navigation message. A position receiver determines the pseudorandom Time Division Multiple Access (TDMA) pulse transmission sequence of each Positioning-Unit Device by interrogation of each Positioning-Unit Devices navigation message. In an alternative embodiment, the pseudorandom Time Division Multiple Access (TDMA) pulse transmission sequence may be associated with the Positioning-Unit Device Pseudorandom Number (PRN) code. In this embodiment the position receiver determines Time Division Multiple Access (TDMA) pulse transmission sequence by associating a received Pseudorandom Number (PRN) code with a predetermined Time Division Multiple Access (TDMA) pulse transmission sequence. A Positioning-Unit Device may also supply Time Division Multiple Access (TDMA) pulse transmission sequences, Pseudorandom Number (PRN) codes, and position co-ordinates for all Positioning-Unit Devices in its vicinity via its navigation message, thus allowing a position receiver to quickly acquire and synchronize to neighbouring Positioning-Unit Devices.

It will of course be realized that whilst the above has been given by way of an illustrative example of this invention, all such and other modifications and variations hereto, as would be apparent to persons skilled in the art, are deemed to fall within the broad scope and ambit of this invention as is herein set forth.

What is claimed is:

1. A method for determining accurate range measurements in multipath and poor signal-to-noise ratio environments and subsequently improving location determination at a position receiver incorporating a directionally agile beam antenna, said position receiver configured to receive Time Division Multiple Access (TDMA) positioning signals transmitted by a network of synchronized positioning-unit devices at known locations, the method comprising:
    a) calculating the location of said position receiver from said received Time Division Multiple Access (TDMA) positioning signals, and
    b) steering a directional gain pattern of said directionally agile beam antenna exclusively towards the origin of the currently received Time Division Multiple Access (TDMA) positioning signal, said steering responsive to:
        i) said calculated location of said position receiver, and
        ii) said known locations of said synchronized positioning-unit devices.

2. The method of claim 1, wherein said calculating the location of said position receiver form said received Time Division Multiple Access (TDMA) positioning signals additionally includes a calculation of a network time of said positioning signals transmitted by said positioning unit devices at known locations, and said steering is additionally responsive to said calculated network time.

3. The method of claim 1, wherein said calculating the location of said position receiver from said received Time Division Multiple Access (TDMA) positioning signals additionally includes the determination of a Time Division Multiple Access (TDMA) sequence of said positioning signals transmitted by said positioning-unit devices at known locations, and said steering is additionally responsive to said determined Time Division Multiple Access (TDMA) sequence.

4. The method of claim 1, wherein said calculating the location of said position receiver from said received Time Division Multiple Access (TDMA) positioning signals additionally includes a calculation of the propagation delay of said positioning signals transmitted by said positioning-unit devices at known locations, and said steering is additionally responsive to said calculated propagation delay.

5. The method of claim 1 wherein said position receiver incorporating a directionally agile beam antenna is further configured with an attitude determination means, said calculating includes an additional step of determining the attitude of said position receiver, and said steering is additionally responsive to said determined attitude.

6. A method for determining accurate range measurements in multipath and poor signal-to-noise ratio environments in a Time Division Multiple Access (TDMA) location network and subsequently improving the location determination at a position receiver, the method comprising:
   a) deploying a plurality of synchronized positioning-unit devices at known locations transmitting positioning signals in a Time Division Multiple Access (TDMA) sequence;
   b) deploying said position receiver configured with a directionally agile beam antenna;
   c) configuring said directionally agile beam antenna to receive said positioning signals from substantially all directions;
   d) calculating the location of said position receiver from said received positioning signals;
   e) reconfiguring said directionally agile beam antenna to receive said positioning signals from substantially one direction;
   f) steering a directional gain pattern of said reconfigured directionally agile beam antenna exclusively towards the origin of the currently received positioning signal, said steering responsive to:
      i) said calculated location of said position receiver, and
      ii) said known locations of said synchronized positioning-unit devices.

7. The method of claim 6, wherein said calculating the location of said position receiver from said received positioning signals additionally includes a calculation of a network time of said positioning signals transmitted by said positioning-unit devices at known locations, and said steering is additionally responsive to said calculated network time.

8. The method of claim 6, wherein said calculating the location of said position receiver from said received positioning signals additionally includes a determination of a Time Division Multiple Access (TDMA) sequence of said positioning signals transmitted by said positioning-unit devices at known locations, and said steering is additionally responsive to said determined Time Division Multiple Access (TDMA) sequence.

9. The method of claim 6, wherein said calculating the location of said position receiver from said received positioning signals additionally includes a calculation of the propagation delay of said positioning signals transmitted by said positioning-unit devices at known locations, and said steering is additionally responsive to said calculated propagation delay.

10. The method of claim 6, wherein said position receiver configured with a directionally agile beam antenna is further configured with an attitude determination means, said calculating includes an additional step of determining the attitude of said position receiver, and said steering is additionally responsive to said determined attitude.

11. A system for determining accurate range measurements in multipath and poor signal-to-noise ratio environments in a Time Division Multiple Access (TDMA) location network, the system comprising:
   a) a plurality of synchronized positioning-unit devices at known locations transmitting positioning signals in a Time Division Multiple Access (TDMA) sequence;
   b) a position receiver configured with a directionally agile beam antenna;
   c) means configured to calculate the location of said position receiver from said transmitted positioning signals;
   d) means configured to steer a directional gain pattern of said directionally agile beam antenna exclusively towards the origin of the currently received positioning signal, said steering responsive to:
      i) said calculated location of said position receiver, and
      ii) said known locations of said synchronized positioning-unit devices.

12. The system of claim 11, wherein said means configured to calculate the location of said position receiver additionally includes a means configured to calculate a network time of said positioning signals transmitted by said positioning-unit devices at known locations, and said steering means is additionally responsive to said calculated network time.

13. The system of claim 11, wherein said means configured to calculate the location of said position receiver additionally includes a means configured to determine a Time Division Multiple Access (TDMA) sequence of said positioning signals transmitted by said positioning-unit devices at known locations, and said steering means is additionally responsive to said determined Time Division Multiple Access (TDMA) sequence.

14. The system of claim 11, wherein said means configured to calculate the location of said position receiver additionally includes a means configured to calculate the propagation delay of said positioning signals transmitted by said positioning-unit devices at known locations, and said steering means is additionally responsive to said calculated propagation delay.

15. The system of claim 11, wherein said position receiver configured with a directionally agile beam antenna is further configured with an attitude determination means, said means configured to calculate the location of said position receiver includes an additional means configured to determine the attitude of said position receiver, and said steering means is additionally responsive to said determined attitude.

16. A system for determining accurate range measurements in multipath and poor signal-to-noise ratio environments in a Time Division Multiple Access (TDMA) location network, the system comprising:
   a) a plurality of synchronized positioning-unit devices at known locations transmitting positioning signals in a Time Division Multiple Access (TDMA) sequence;

b) a position receiver configured with a directionally agile beam antenna;

c) means configured to adjust said directionally agile beam antenna to receive said transmitted positioning signals from substantially all directions;

d) means configured to calculate the location of said position receiver from said transmitted positioning signals;

e) means configured to readjust said directionally agile beam antenna to receive said transmitted positioning signals from substantially one direction;

f) means configured to steer a directional gain pattern of said directionally agile beam antenna exclusively towards the origin of the currently received positioning signal, said steering responsive to:

i) said calculated location of said position receiver, and ii) said known locations of said synchronized positioning-unit devices.

17. The system of claim 16, wherein said means configured to calculate the location of said position receiver additionally includes a means configured to calculate a network time of said positioning signals transmitted by said positioning-unit devices at known locations, and said steering means is additionally responsive to said calculated network time.

18. The system of claim 16, wherein said means configured to calculate the location of said position receiver additionally includes a means configured to determine a Time Division Multiple Access (TDMA) sequence of said positioning signals transmitted by said positioning-unit devices at known locations, and said steering means is additionally responsive to said determined Time Division Multiple Access (TDMA) sequence.

19. The system of claim 16, wherein said means configured to calculate the location of said position receiver additionally includes a means configured to calculate the propagation delay of said positioning signals transmitted by said positioning-unit devices at known locations, and said steering means is additionally responsive to said calculated propagation delay.

20. The system of claim 16, wherein said position receiver configured with a directionally agile beam antenna is further configured with an attitude determination means, said means configured to calculate the location of said position receiver includes an additional means configured to determine the attitude of said position receiver, and said steering means is additionally responsive to said determined attitude.

* * * * *